(12) United States Patent
Tsai (10) Patent No.: US 8,222,545 B2
(45) Date of Patent: Jul. 17, 2012

(54) KEYBOARD

(75) Inventor: Ching-Cheng Tsai, Taipei Hsien (TW)

(73) Assignee: Chicony Electronic Co. Ltd., Taipei Hsien (TW)

( * ) Notice: Subject to any disclaimer, the term of this patent is extended or adjusted under 35 U.S.C. 154(b) by 241 days.

(21) Appl. No.: 12/784,192

(22) Filed: May 20, 2010

(65) Prior Publication Data

US 2011/0042195 A1 Feb. 24, 2011

(30) Foreign Application Priority Data

Aug. 19, 2009 (TW) .............................. 98127853 A (51) Int. Cl.
*H01H 9/26* (2006.01)

(52) U.S. Cl. .................................................. 200/5 A

(58) Field of Classification Search .................. 200/5 A, 200/512–517, 553, 557, 315, 316, 339, 341–345
See application file for complete search history.

(56) References Cited

U.S. PATENT DOCUMENTS

| | | | |
|---|---|---|---|
| 4,467,150 A * | 8/1984 | Leitermann et al. | 200/5 A |
| 5,335,137 A * | 8/1994 | English et al. | 361/220 |
| 5,748,114 A * | 5/1998 | Koehn | 341/22 |
| 2001/0030119 A1 * | 10/2001 | Maruyama et al. | 200/344 |

* cited by examiner

*Primary Examiner* — Edwin A. Leon
(74) *Attorney, Agent, or Firm* — Morris Manning & Martin LLP; Tim Tingkang Xia, Esq.

(57) ABSTRACT

A keyboard includes: a membrane circuit board comprising a plurality of switches; at least one keycap provided with a plurality of contact portions, each of which corresponding to one of the plurality of switches of the membrane circuit board; and a base plate provided with a plurality of openings each of which being positioned at a location corresponding to one of the plurality of switches of the membrane circuit board and one of the plurality of contact portions of the keycap, a buffering portion being formed at a corner adjoining the base plate and one of the plurality of openings.

11 Claims, 10 Drawing Sheets

KEYBOARD

CROSS-REFERENCE TO RELATED APPLICATIONS

This non-provisional application claims priority under 35 U.S.C. §119(a) on Patent Application No(s). 098127853 filed in Taiwan, R.O.C. on Aug. 19, 2009, the entire contents of which are hereby incorporated by reference.

BACKGROUND OF THE INVENTION

1. Field of the Invention

The present invention relates to a keyboard, and more particularly, to a keyboard comprising keys having improved sensitivity to operation.

2. Description of the Prior Art

A keyboard generally comprises several types of keys for executing different functions, such as alpha numeric keys for the input of various characters and hot keys (Tab key, Shift key, Space key, etc.) for executing specific functions. Generally, keys with different functions are of different size or shape, however, it is required that all the keycaps be pressed centrally to activate the switches. This is because, if the position to which pressure is applied is proximate to an edge of the keycap, the elastic contact body of the key may not deform properly to activate the switch, resulting in an ineffective operation of the key. This happens especially in the longer keys. As an ongoing trend toward compact electronic products, the input devices have become smaller and thinner, leading to a reduction in the stroke of the key. With the shorter stroke of the key, the switch may not be properly pressed to generate a corresponding signal when the user presses the keycap at a high speed. Such a drawback causes much inconvenience for the user.

Figure 8A:
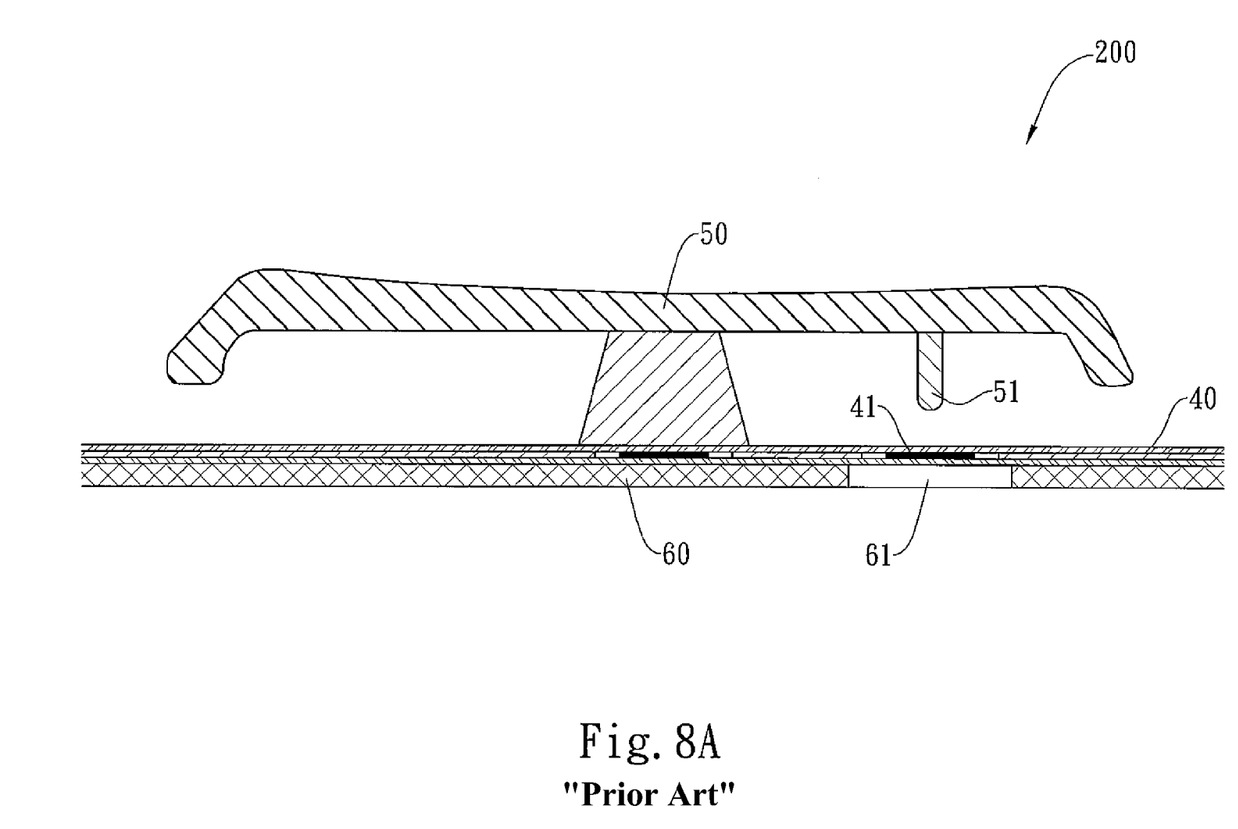
FIG. 8A is a sectional view of a prior art keyboard.
Figure 8B:
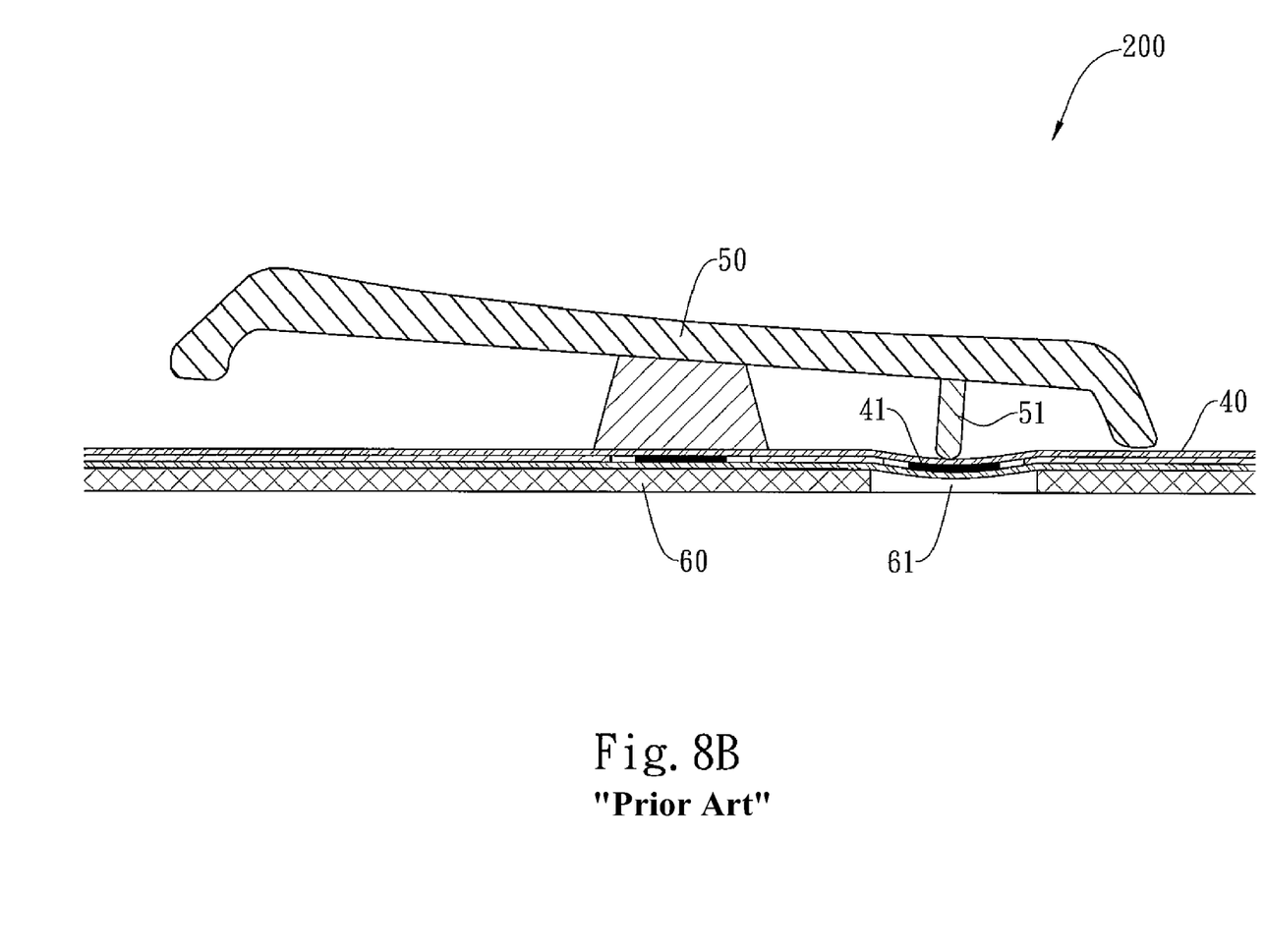
FIG. 8B is a sectional view showing the operation of the prior art keyboard.
Figure 8C:
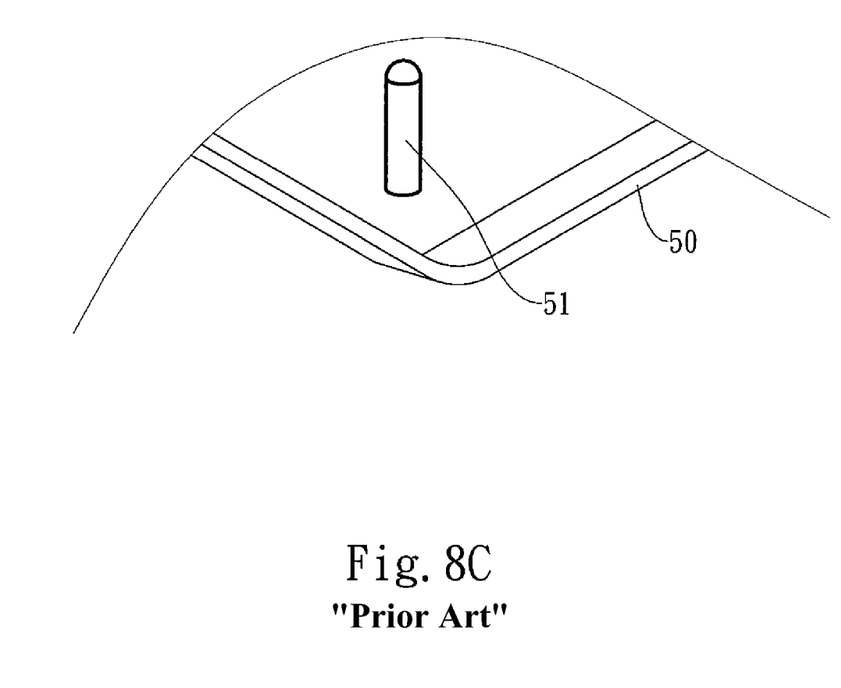
FIG. 8C is an enlarged partial block diagram showing a keycap of the prior art keyboard.

To resolve the aforementioned drawback, there is provided a prior art keyboard 200, including: a membrane circuit board 40, a keycap 50 and a base plate 60. As shown in FIGS. 8A and 8B, the membrane circuit board 40 is disposed on top of the base plate 60 and comprises a plurality of switches 41; the keycap 50 is disposed on top of the membrane circuit board 40 and comprises a plurality of columnar bodies 51 perpendicular to the bottom surface thereof; the base plate 60 is provided with an opening 61 positioned at a location corresponding to one of the plurality of columnar bodies 51. When the user presses an edge of the keycap 50, one of the plurality of columnar bodies 51 located at the bottom surface of the keycap 50 will move downwardly to press the membrane circuit board 40, thereby one of the plurality of switches 41 of the membrane circuit board 40 can be turned on to generate a corresponding signal. As each columnar body 51 is arranged to be perpendicular to the bottom surface of the keycap 50, the area where the columnar body 51 is in contact with the membrane circuit board 40 is rather small. Accordingly, the pressure applied by the columnar body 51 is concentrated at certain area of the membrane circuit board 40, causing damages to the area which frequently receives pressure easily. In addition, a corner adjoining the base plate 60 and the opening 61, along which a portion of the membrane circuit board 40 dips into the opening 61 when being pressed by the columnar body 51, is right-angled so that creases are prone to be formed on the membrane circuit board 40, inflicting damages easily.

Therefore, it remains a problem to be solved in the art as to how the durability of the prior art membrane circuit board, which is damaged easily when being pressed frequently, could be improved.

SUMMARY OF THE INVENTION

One object of the present invention is to provide a keyboard comprising keys with increased sensitivity.

Another object of the present invention is to provide a keyboard in which the contact area between the contact portion of the keycap and the membrane circuit board is increased.

A present keyboard that achieves the aforementioned objects includes: a membrane circuit board comprising a plurality of switches; at least one keycap provided with a plurality of contact portions, each of which corresponding to one of the plurality of switches of the membrane circuit board; and a base plate provided with a plurality of openings each of which being positioned at a location corresponding to one of the plurality of switches of the membrane circuit board and one of the plurality of contact portions of the keycap, a buffering portion being formed at a corner adjoining the base plate and one of the plurality of openings.

The aforementioned membrane circuit board comprises an upper layer, a middle layer and a lower layer.

The aforementioned middle layer is provided with a through hole, and the bottom surface of the upper layer and the top surface of the lower layer are each provided with a contact corresponding to the through hole. The two contacts are arranged corresponding to each other so as to form a switch of the membrane circuit board.

The aforementioned lower layer is provided with a gas void, which is positioned at a location corresponding to the through hole of the middle layer for venting and admitting air.

The aforementioned contact portion has a columnar shape and is horizontally disposed at one of the four edges or the bottom surface of the keycap.

The aforementioned contact portion has a semi-cylindrical shape and is horizontally disposed at one of the four edges or the bottom surface of the keycap.

The aforementioned contact portion has a trapezoidal columnar shape and is horizontally disposed at one of the four edges or the bottom surface of the keycap.

The aforementioned contact portion has a circular arc shape and is horizontally disposed at one of the four edges or the bottom surface of the keycap.

The aforementioned buffering portion is a circular arc surface.

The aforementioned buffering portion is a beveled surface.

The aforementioned buffering portion is an inwardly formed circular arc surface.

DETAILED DESCRIPTION OF THE PREFERRED EMBODIMENTS

Figure 1:
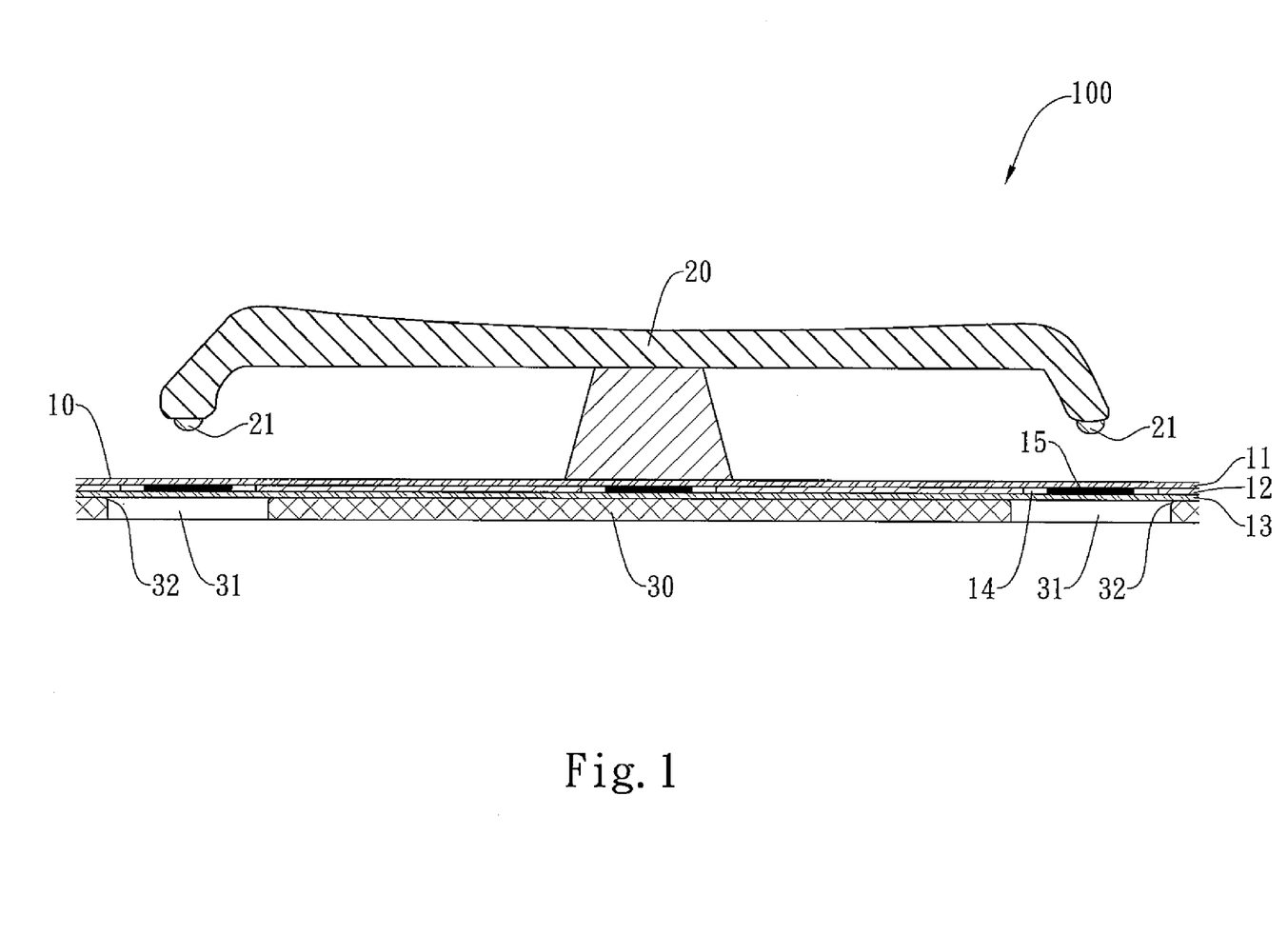
FIG. 1 is a sectional view showing an embodiment of the present keyboard.

FIG. 1 is a sectional view showing an embodiment of the present keyboard 100. The drawing only shows certain components while the rest of the components, such as scissor assembly, light guide, baffle and support plate, are omitted for illustration purposes. The keyboard 100 includes: a membrane circuit board 10 comprising a plurality of switches 15; at least one keycap 20 disposed on top of the membrane circuit board 10 and provided with a plurality of contact portions 21, each of which corresponding to one of the plurality of switches 15 of the membrane circuit board 10; and a base plate 30 disposed underneath the membrane circuit board 10 and provided with a plurality of openings 31 each of which being positioned at a location corresponding to one of the plurality of switches 15 of the membrane circuit board 10 and one of the plurality of contact portions 21 of the keycap 20, a buffering portion 32 being formed at a corner adjoining the base plate 30 and one of the plurality of openings 31.

The aforementioned membrane circuit board 10 comprises an upper layer 11, a middle layer 12 and a lower layer 13. The middle layer 12 is provided with a through hole 14, and the bottom surface of the upper layer 11 and the top surface of the lower layer 13 are each provided with a contact corresponding to the through hole 14. The two contacts are arranged corresponding to each other so as to form a switch 15 of the membrane circuit board 10. When the user presses the keycap 20, the contact portion 21 will press the upper layer 11, causing the contact of the upper layer 11 to touch the contact of the lower layer 13 to establish an electrical connection therebetween, thereby the switch 15 is turned on to generate a corresponding signal.

Figure 2:
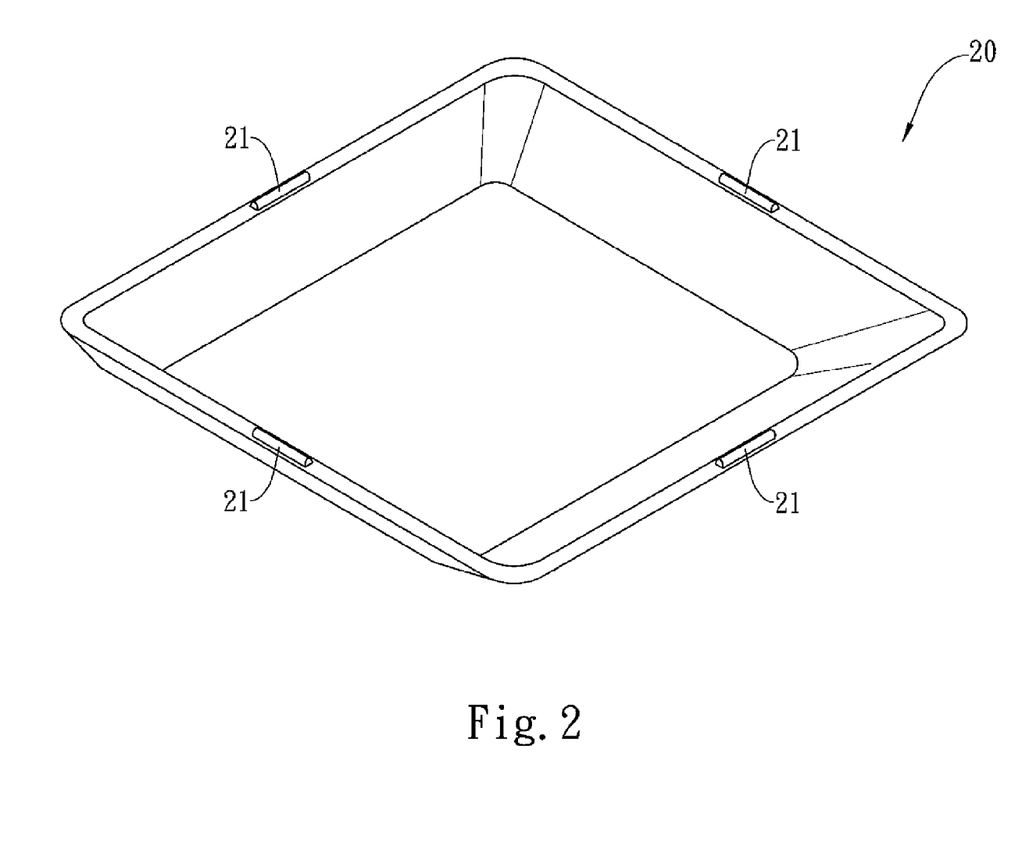
FIG. 2 is a bottom block diagram showing an embodiment of a keycap of the present keyboard.

Referring to FIG. 1 and FIG. 2, a bottom block diagram showing an embodiment of a keycap of the present keyboard, the aforementioned contact portion 21 has a columnar shape and is horizontally disposed at one of the four edges of the keycap 20. The horizontal placement of the column-shaped contact portion 21 increases the area where the contact portion 21 is in contact with the membrane circuit board 10. Consequently, the membrane circuit board 10 will not be damaged easily when being pressed by the contact portion 21 frequently because the area thereof to which the pressure from the contact portion 21 is applied becomes larger. In this embodiment, the contact portion 21 is of a semi-cylindrical shape.

The opening 31 is formed by punch cutting the base plate 30, thereby to shape the buffering portion 32 into a circular arc surface. The circular arc surface, along which a portion of the membrane circuit board 10 dips into the opening 31 of the base plate 30 when being pressed by the contact portion 21, acts as a buffer, so that creases will not be formed on the membrane circuit board 10. Consequently, the durability of the membrane circuit board 10 can be enhanced.

Figure 3:
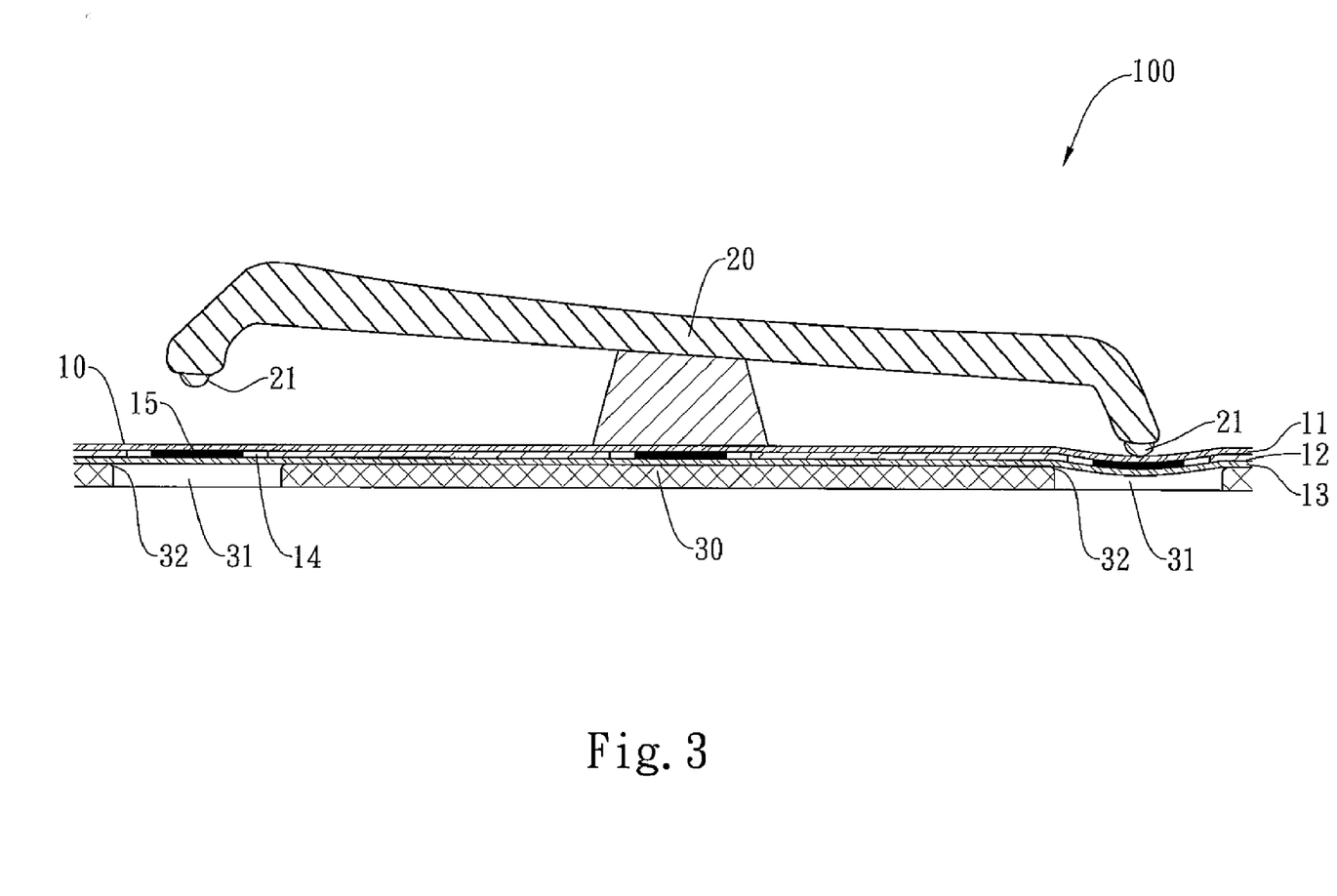
FIG. 3 is a sectional view showing the operation of the present keyboard.

FIG. 3 is a sectional view showing the operation of the present keyboard. When the user presses an edge of the keycap 20, the column-shaped contact portion 21, which is horizontally disposed at the edge of the keycap 20 to increase the area where it is in contact with the membrane circuit board 10, moves downwardly to press the membrane circuit board 10, causing the contact of the upper layer 11 to touch the contact of the lower layer 13 to establish an electrical connection therebetween, thereby the switch 15 is turned on to generate a corresponding signal. At the same time, a portion of the membrane circuit board 10 dips into the opening 31 of the base plate 30 along the buffering portion 32, which enables the membrane circuit board to 10 curve smoothly without creating creases until the applied pressure is removed.

Figure 4A:
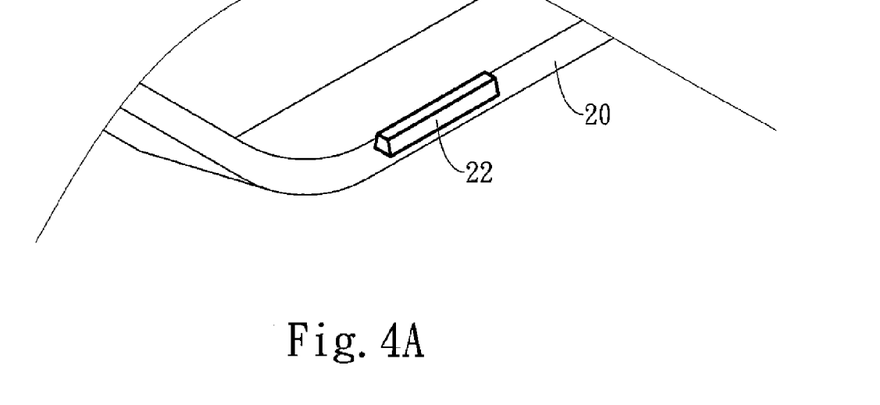
FIG. 4A is an enlarged partial block diagram showing an embodiment of the contact portion of the present keyboard.
Figure 4B:
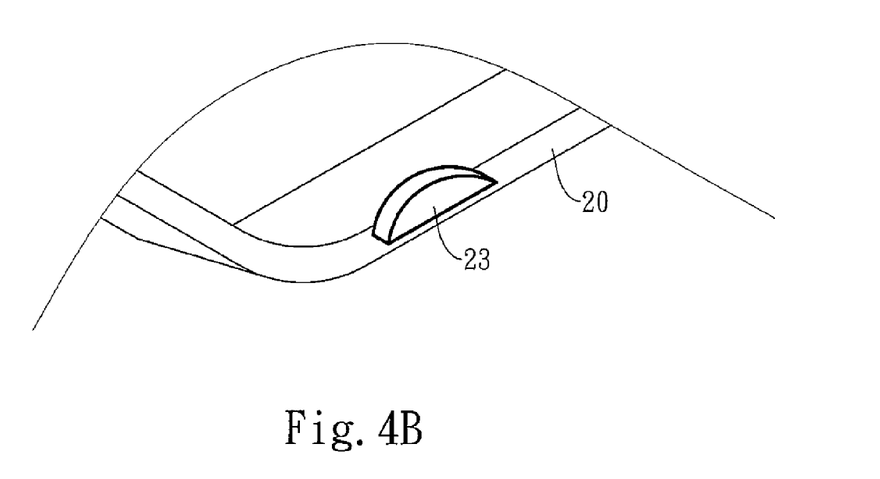
FIG. 4B is an enlarged partial block diagram showing another embodiment of the contact portion of the present keyboard.

FIGS. 4A and 4B are enlarged partial block diagrams showing different embodiments of the contact portion of the present keyboard. As shown in FIG. 4A, the contact portion 22 has a trapezoidal columnar shape and is horizontally disposed at one of the four edges of the keycap 20. Referring to FIG. 4B, the contact portion 23 has a circular arc shape and is horizontally disposed at one of the four edges of the keycap 20 as well. As the curvature of the arc surface of the contact portion 23 is greater, the area where the contact portion 23 is in contact with the membrane circuit board 10 becomes larger. Therefore, when the membrane circuit board 10 is pressed by the contact portion 23, no crease will be formed thereon.

Figure 5A:
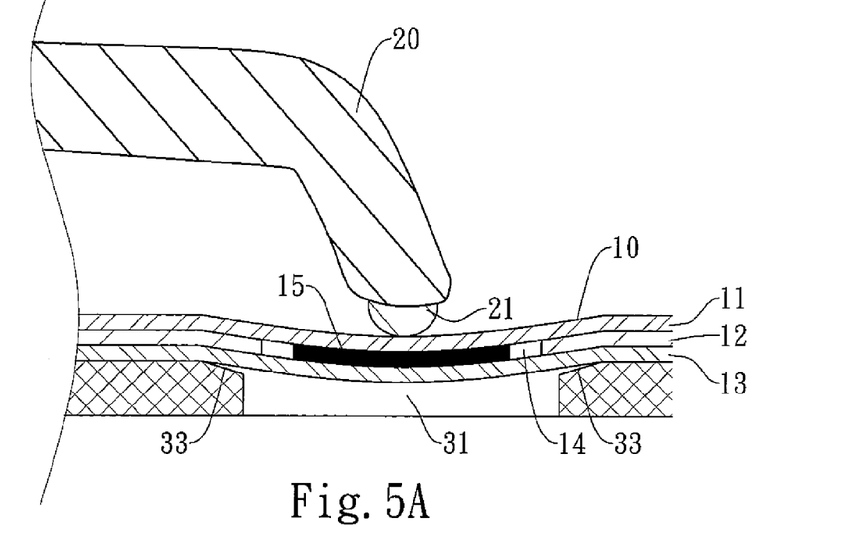
FIG. 5A is an enlarged sectional view showing another embodiment of the present keyboard.

FIG. 5A is an enlarged sectional view showing another embodiment of the present keyboard. In this embodiment, the structure of the keyboard 100 is substantially the same as that of the embodiment shown in FIG. 1 except that the buffering portion 33 is a beveled surface. When the membrane circuit board 10 is pressed by the contact portion 21, a portion thereof dips into the opening 31 of the base plate 30 along the buffering portion 33, which acts as a buffer to prevent creases from forming on the membrane circuit board 10. Consequently, the durability of the membrane circuit board 10 can be enhanced.

Figure 5B:
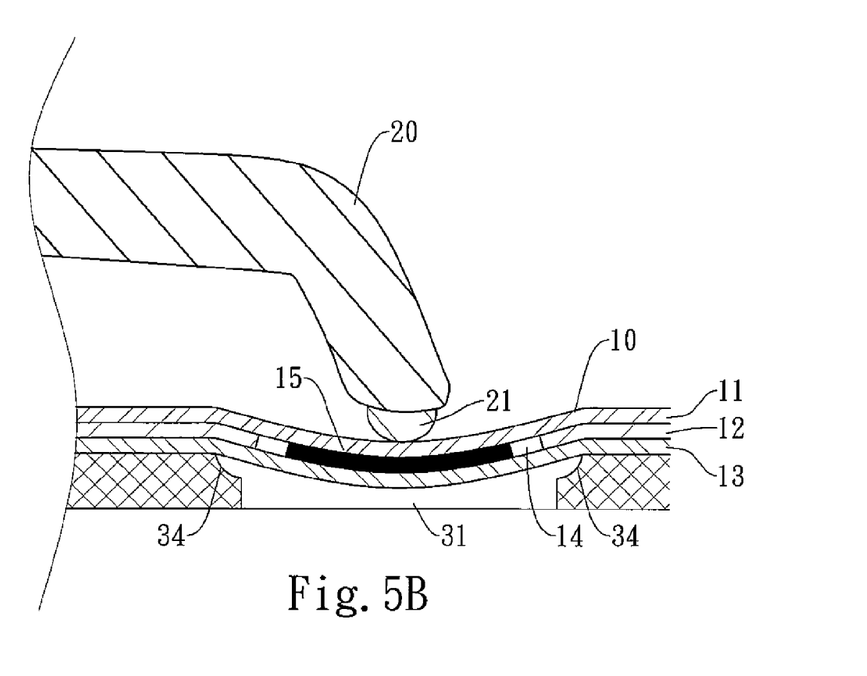
FIG. 5B is an enlarged sectional view showing another embodiment of the present keyboard.

FIG. 5B is an enlarged sectional view showing another embodiment of the present keyboard. In this embodiment, the structure of the keyboard 100 is substantially the same as that of the embodiment shown in FIG. 1 except that the buffering portion 34 is an inwardly formed circular arc surface. When the membrane circuit board 10 is pressed by the contact portion 21, a portion thereof dips into the opening 31 of the base plate 30 along the buffering portion 34, which acts as a buffer to prevent creases from forming on the membrane circuit board 10. Consequently, the durability of the membrane circuit board 10 can be enhanced.

Figure 6:
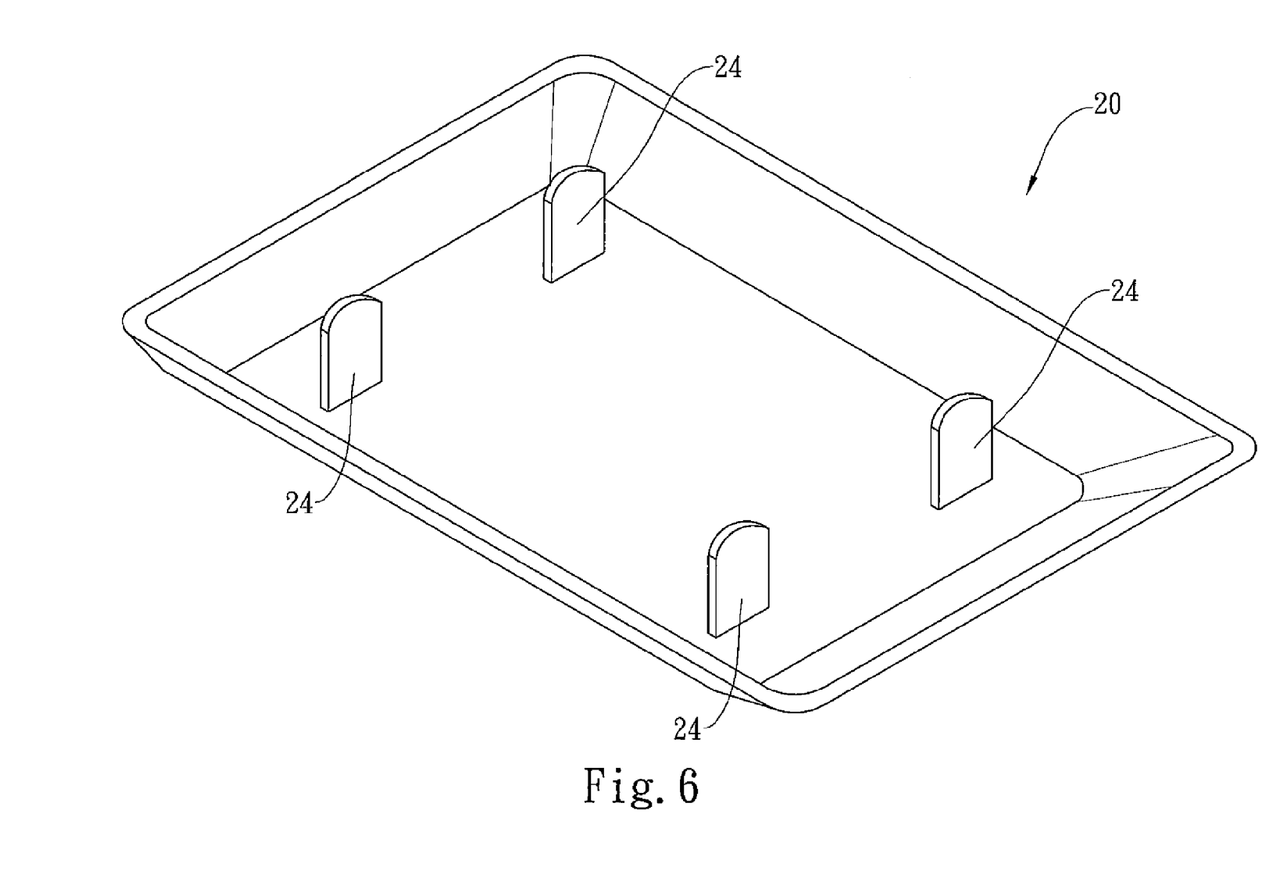
FIG. 6 is a bottom block diagram showing another embodiment of the keycap of the present keyboard.

FIG. 6 is a bottom block diagram showing another embodiment of the keycap of the present keyboard. In this embodiment, the contact portion 24 can alternatively be disposed at the bottom surface of the keycap 20. Moreover, the surface with which the contact portion 24 is in contact with the membrane circuit board 10 is circular arc shaped so that the contact area between the contact portion 24 and the membrane circuit board 10 is increased. Consequently, the membrane circuit board 10 will not be damaged easily when being pressed by the contact portion 24 frequently because the area thereof to which the pressure from the contact portion 24 is applied becomes larger.

Figure 7:
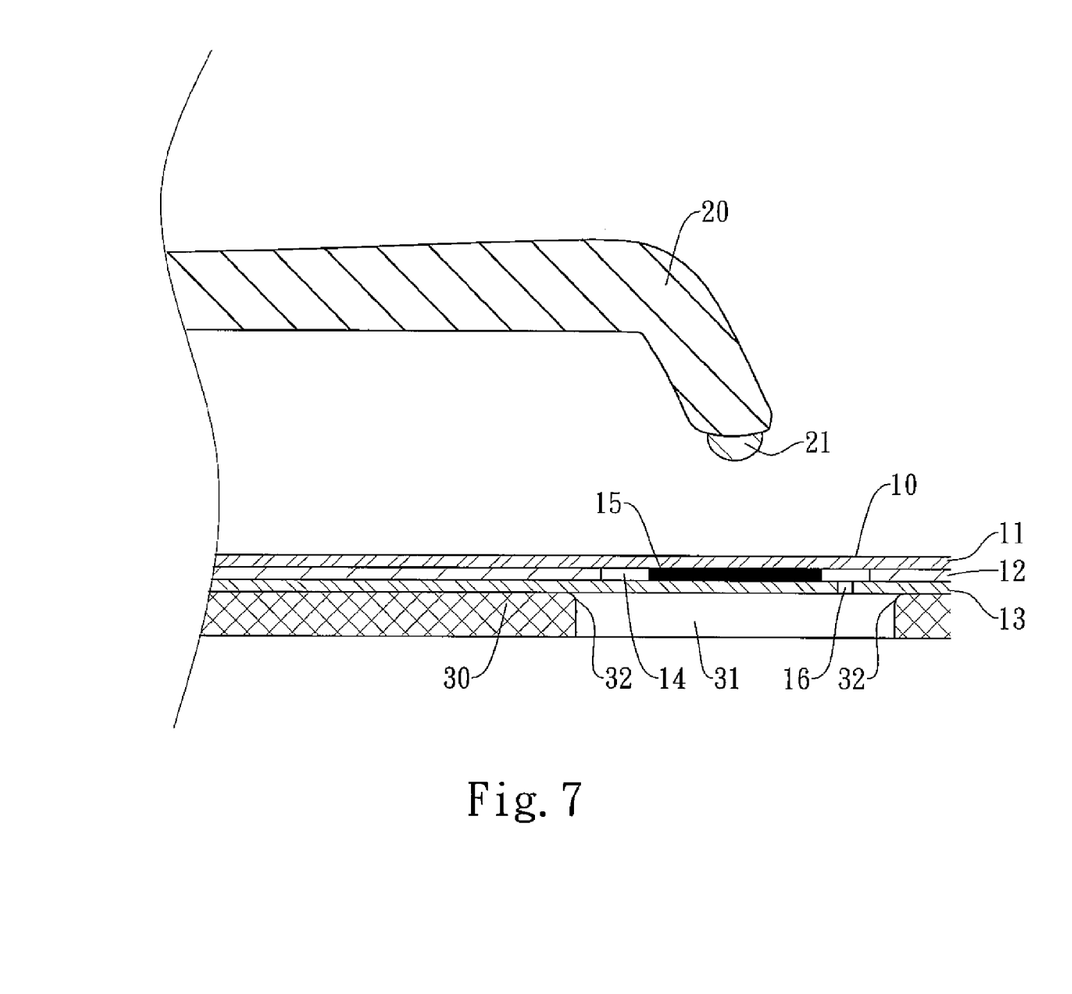
FIG. 7 is an enlarged sectional view showing another embodiment of the present keyboard.

FIG. 7 is an enlarged sectional view showing another embodiment of the present keyboard. In this embodiment, the structure of the keyboard is substantially the same as that of the embodiment shown in FIG. 1 except that the lower layer 13 of the membrane circuit board 10 is provided with a gas void 16, which is positioned at a location corresponding to the through hole 14 of the middle layer 12 for venting and admitting air. When the membrane circuit board 10 is pressed by the keycap 20, the air therewithin will be vented through the gas void 16. When the pressure applied to the membrane circuit board 10 is removed, air is admitted through the gas void to rapidly bring the pressed portion of the membrane circuit board 10 back to the original position.

In the present invention, the horizontal placement of the column-shaped contact portion increases the area where the contact portion is in contact with the membrane circuit board. Consequently, the membrane circuit board will not be damaged easily when being pressed by the contact portion frequently because the area thereof to which the pressure from the contact portion is applied becomes larger. Moreover, a buffering portion is formed at a corner adjoining the base plate and the opening. When the membrane circuit board is pressed by the contact portion, a portion thereof dips into the opening of the base plate along the buffering portion, which acts as a buffer to prevent creases from forming on the membrane circuit board. Consequently, the durability of the membrane circuit board can be enhanced.

With the detailed description of the preferred embodiments of the present invention, it will be apparent to those skilled in the art that various modifications and variations can be made to the present invention without departing from the spirit and scope of the present invention. The embodiments depicted above are not intended as limitations but rather as examples of the present invention. For example, the contact portion of the present invention can be disposed at either one of the four edges or the bottom surface of the keycap.

What is claimed is:

1. A keyboard including:
   a membrane circuit board comprising a plurality of switches;
   at least one keycap provided with a plurality of contact portions, each of which corresponding to one of the plurality of switches of the membrane circuit board; and
   a base plate provided with a plurality of openings each of which being positioned at a location corresponding to one of the plurality of switches of the membrane circuit board and one of the plurality of contact portions of the at least one keycap, a buffering portion being formed at a corner adjoining the base plate and one of the plurality of openings.

2. The keyboard according to claim 1, wherein the membrane circuit board comprises an upper layer, a middle layer and a lower layer.

3. The keyboard according to claim 2, wherein the middle layer is provided with a through hole, and the bottom surface of the upper layer and the top surface of the lower layer are each provided with a contact corresponding to the through hole; and wherein the two contacts are arranged corresponding to each other so as to form a switch of the membrane circuit board.

4. The keyboard according to claim 3, wherein the lower layer is provided with a gas void, the gas void being positioned at a location corresponding to the through hole of the middle layer for venting and admitting air.

5. The keyboard according to claim 1, wherein each of the plurality of contact portions has a columnar shape and is horizontally disposed at one of the four edges or the bottom surface of the keycap.

6. The keyboard according to claim 1, wherein each of the plurality of contact portions has a semi-cylindrical shape and is horizontally disposed at one of the four edges or the bottom surface of the keycap.

7. The keyboard according to claim 1, wherein each of the plurality of contact portions has a trapezoidal columnar shape and is horizontally disposed at one of the four edges or the bottom surface of the keycap.

8. The keyboard according to claim 1, wherein each of the plurality of contact portions has a circular arc shape and is horizontally disposed at one of the four edges or the bottom surface of the keycap.

9. The keyboard according to claim 1, wherein the buffering portion is a circular arc surface.

10. The keyboard according to claim 1, wherein the buffering portion is beveled surface.

11. The keyboard according to claim 1, wherein the buffering portion is an inwardly formed circular arc surface.

* * * * *